D. J. STRICKLAND.
AUTOMATIC BRICK MAKING MACHINE.
APPLICATION FILED NOV. 19, 1915.

1,344,099.

Patented June 22, 1920.
6 SHEETS—SHEET 1.

D. J. STRICKLAND.
AUTOMATIC BRICK MAKING MACHINE.
APPLICATION FILED NOV. 19, 1915.

1,344,099.

Patented June 22, 1920.
6 SHEETS—SHEET 2.

D. J. STRICKLAND.
AUTOMATIC BRICK MAKING MACHINE.
APPLICATION FILED NOV. 19, 1915.

1,344,099. Patented June 22, 1920.
6 SHEETS—SHEET 4.

Inventor,
D. J. Strickland

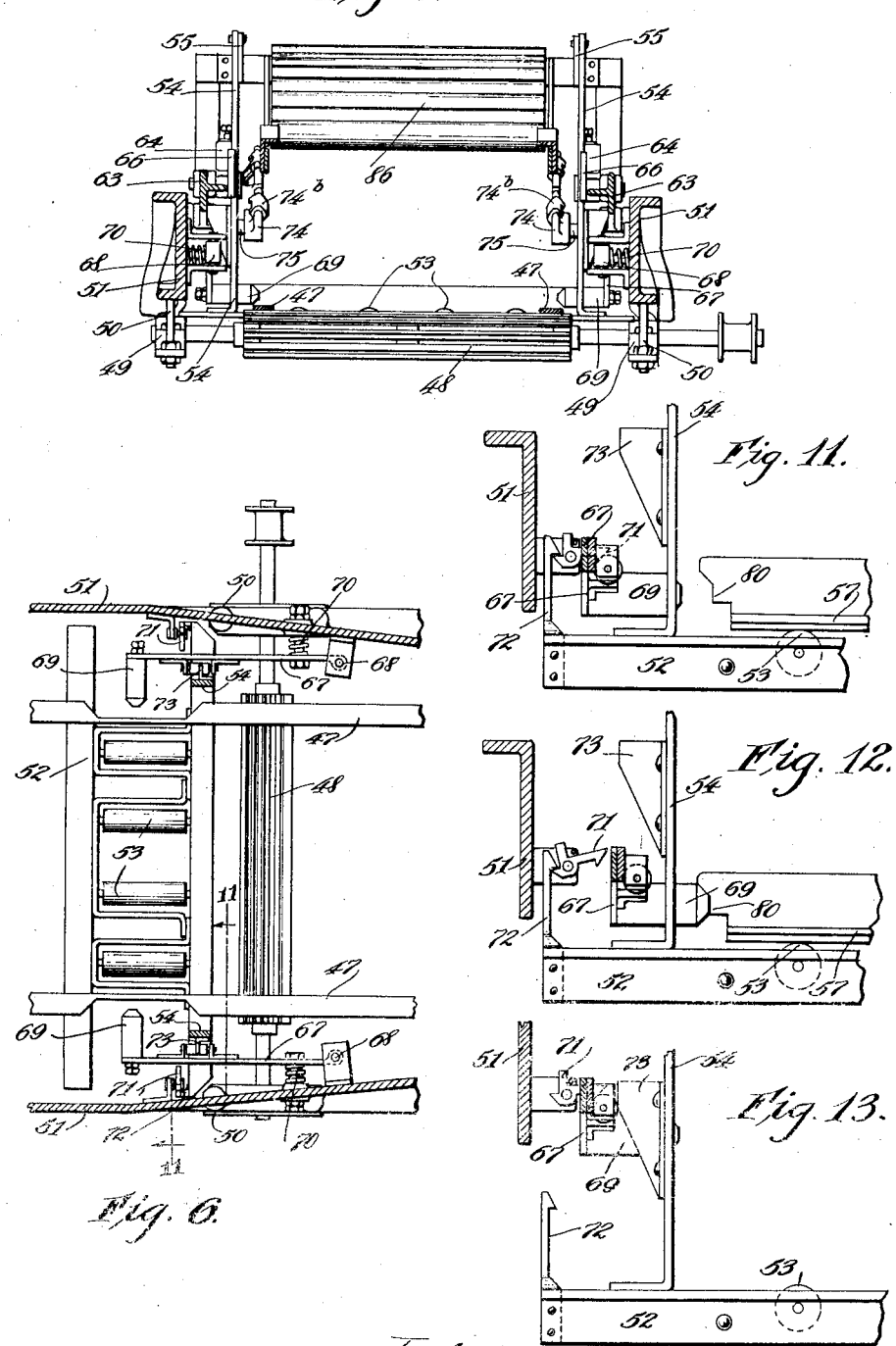

D. J. STRICKLAND.
AUTOMATIC BRICK MAKING MACHINE.
APPLICATION FILED NOV. 19, 1915.
1,344,099.
Patented June 22, 1920.
6 SHEETS—SHEET 6.
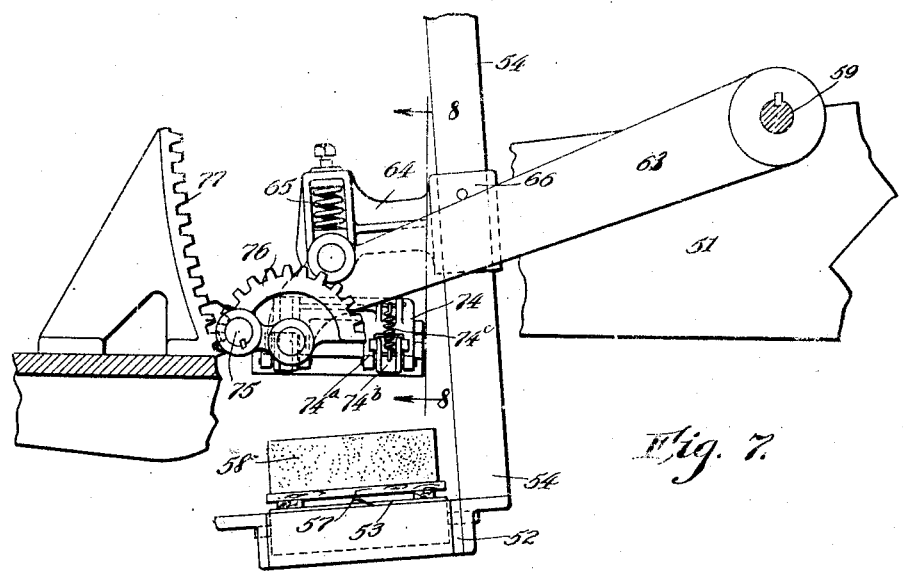
*Fig. 7.*
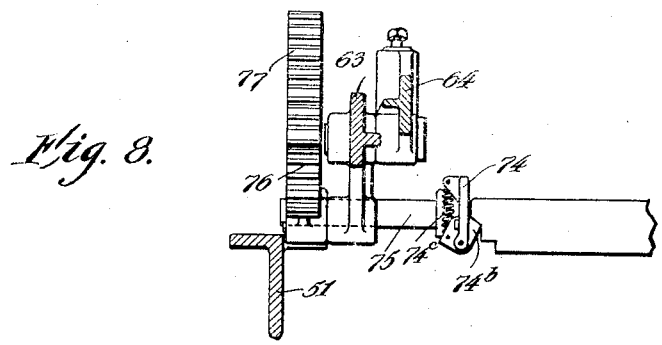
*Fig. 8.*
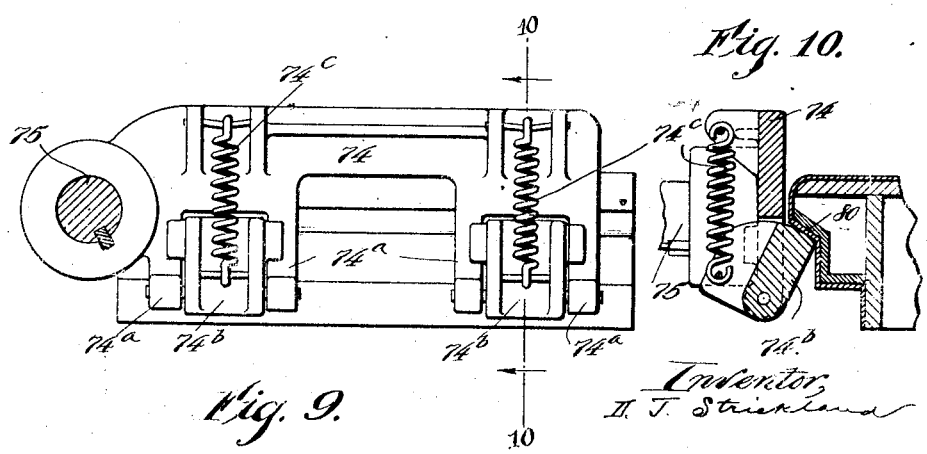
*Fig. 10.*
*Fig. 9.*
Inventor,
D. J. Strickland
By Hull, Smith, Brock & West
Attys.

UNITED STATES PATENT OFFICE.

DAVID J. STRICKLAND, OF CLEVELAND, OHIO, ASSIGNOR TO THE STRICKLAND COMPANY, OF CLEVELAND, OHIO, A CORPORATION OF OHIO.

AUTOMATIC BRICK-MAKING MACHINE.

1,344,099.　　　　Specification of Letters Patent.　　Patented June 22, 1920.

Application filed November 19, 1915. Serial No. 62,274.

*To all whom it may concern:*

Be it known that I, DAVID J. STRICKLAND, a citizen of the United States, residing at Cleveland, in the county of Cuyahoga and State of Ohio, have invented a certain new and useful Improvement in Automatic Brick-Making Machines, of which the following is a full, clear, and exact, description, reference being had to the accompanying drawings.

This invention relates generally to brick machines and more particularly to an automatic brick machine, the object being to provide a strong, simple and durable machine which will rapidly carry out all of the various brick making operations, the only manual operation being the location of the pallet to receive the bricks from the molds.

Another object of the invention is to provide a machine which will quickly and easily produce a brick of uniform high grade quality and which in addition to accurately molding the brick will trim or scrape the same while in the mold preparatory to discharging the bricks upon the pallets.

Another object of the invention is to provide for the automatic separation or dislodgment of the bricks from the molds and also for automatically lifting the molds after they have been so discharged and another object of the invention is to provide for resanding the molds thus lifted and automatically returning them to the machine to receive another charge of clay.

Another object of the invention is to provide certain safety appliances whereby undue strain will be relieved and breakage of the machine thereby avoided.

With these objects in view and certain others which will appear as the description of the mechanism proceeds, the invention consists in the novel features of construction of the various parts and in the manner of combining or arranging the same, all of which will be fully described hereinafter and pointed out in the appended claims.

Figure 1:
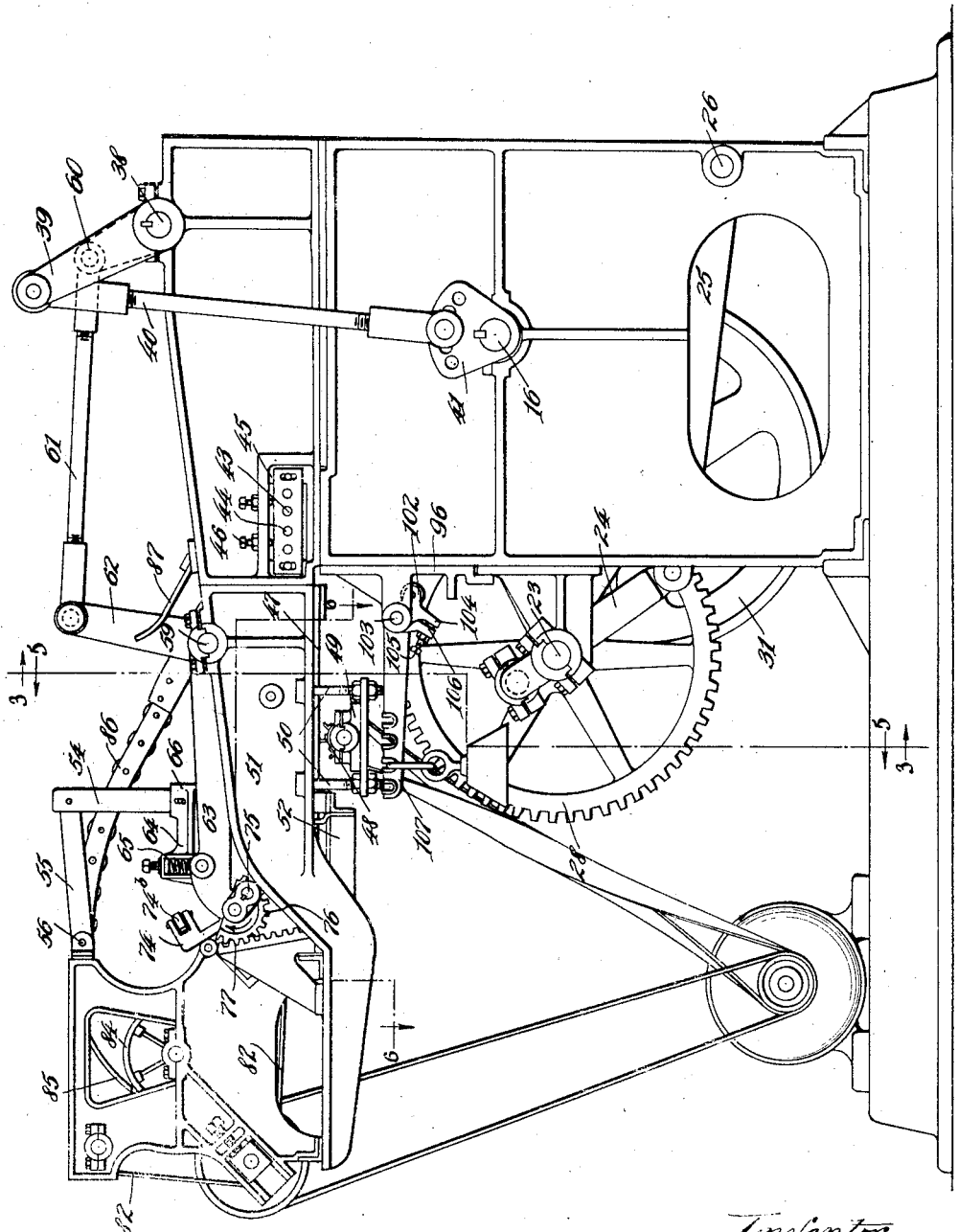
Figure 2:
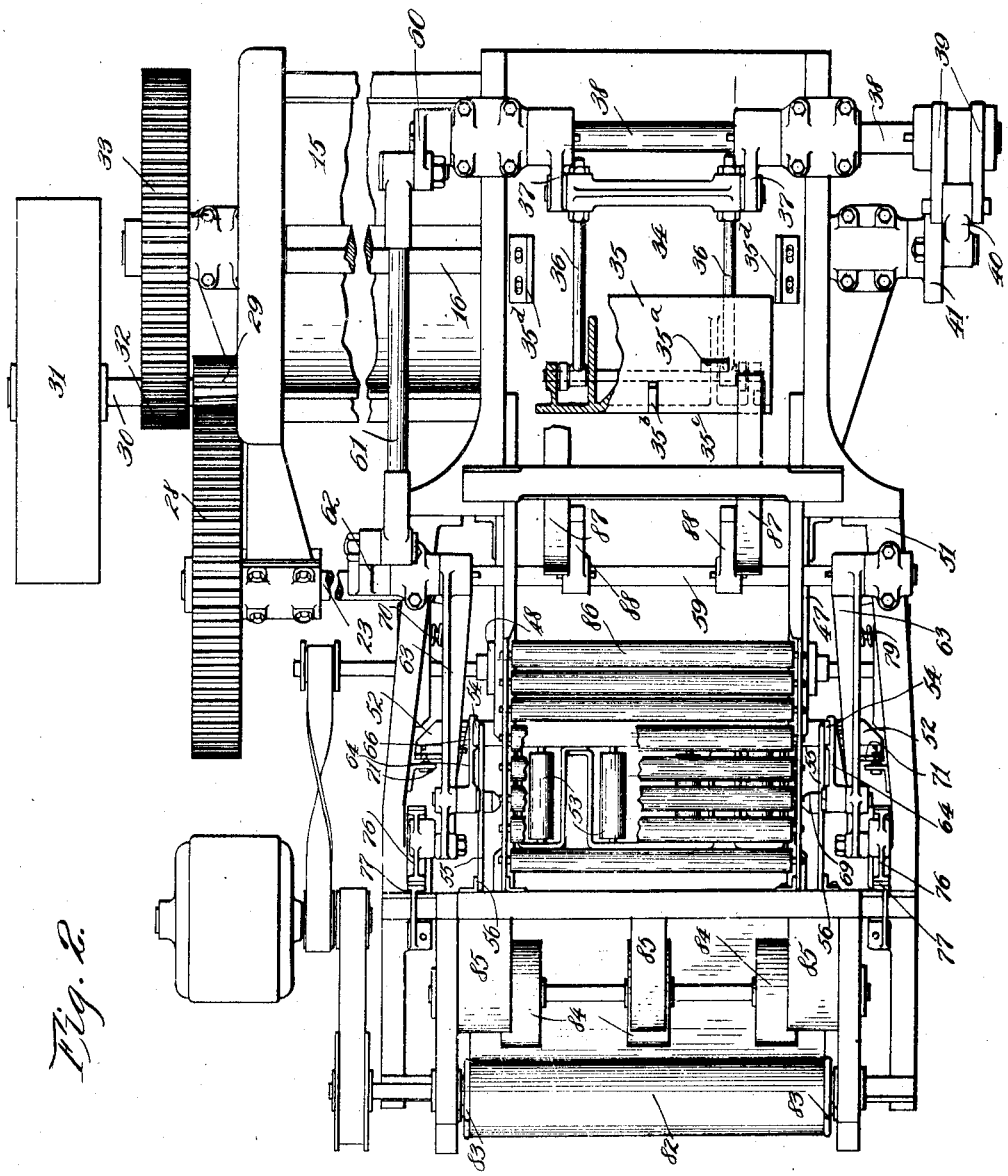
Figure 3:
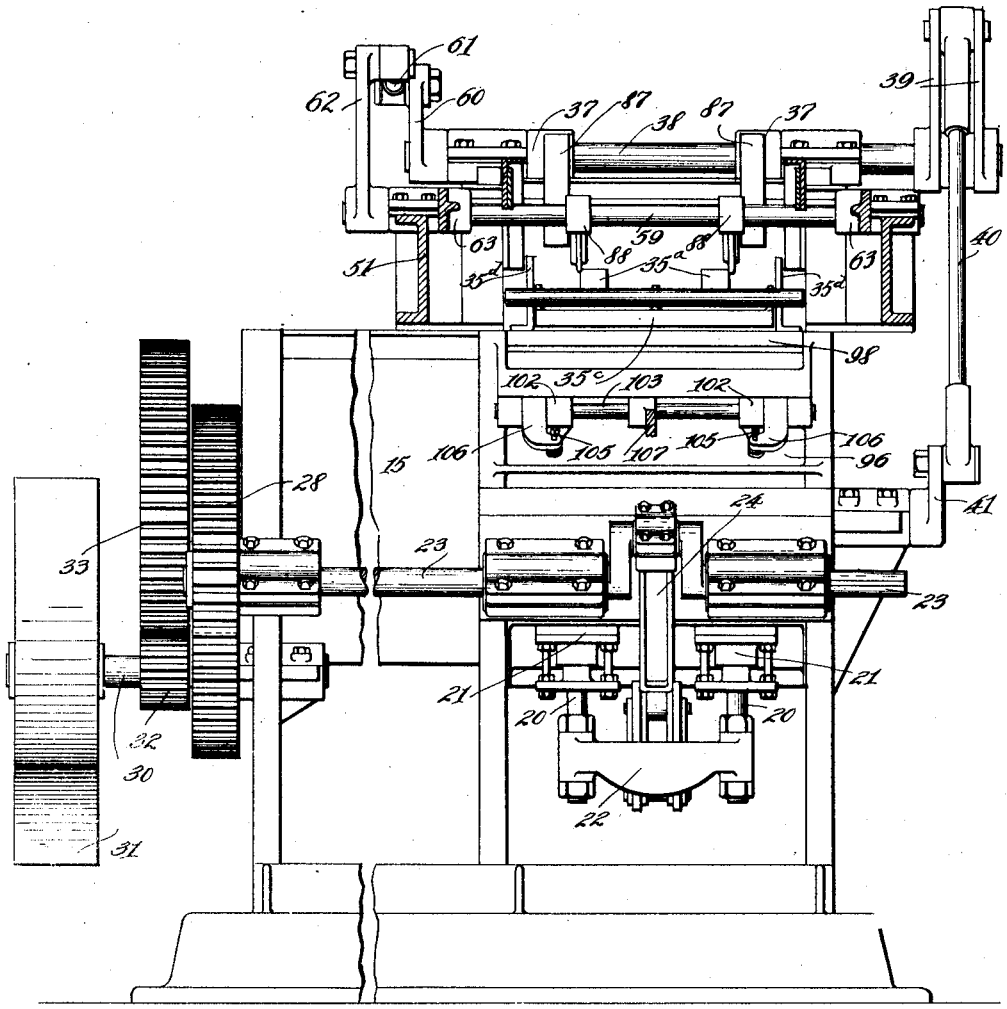
Figure 4:
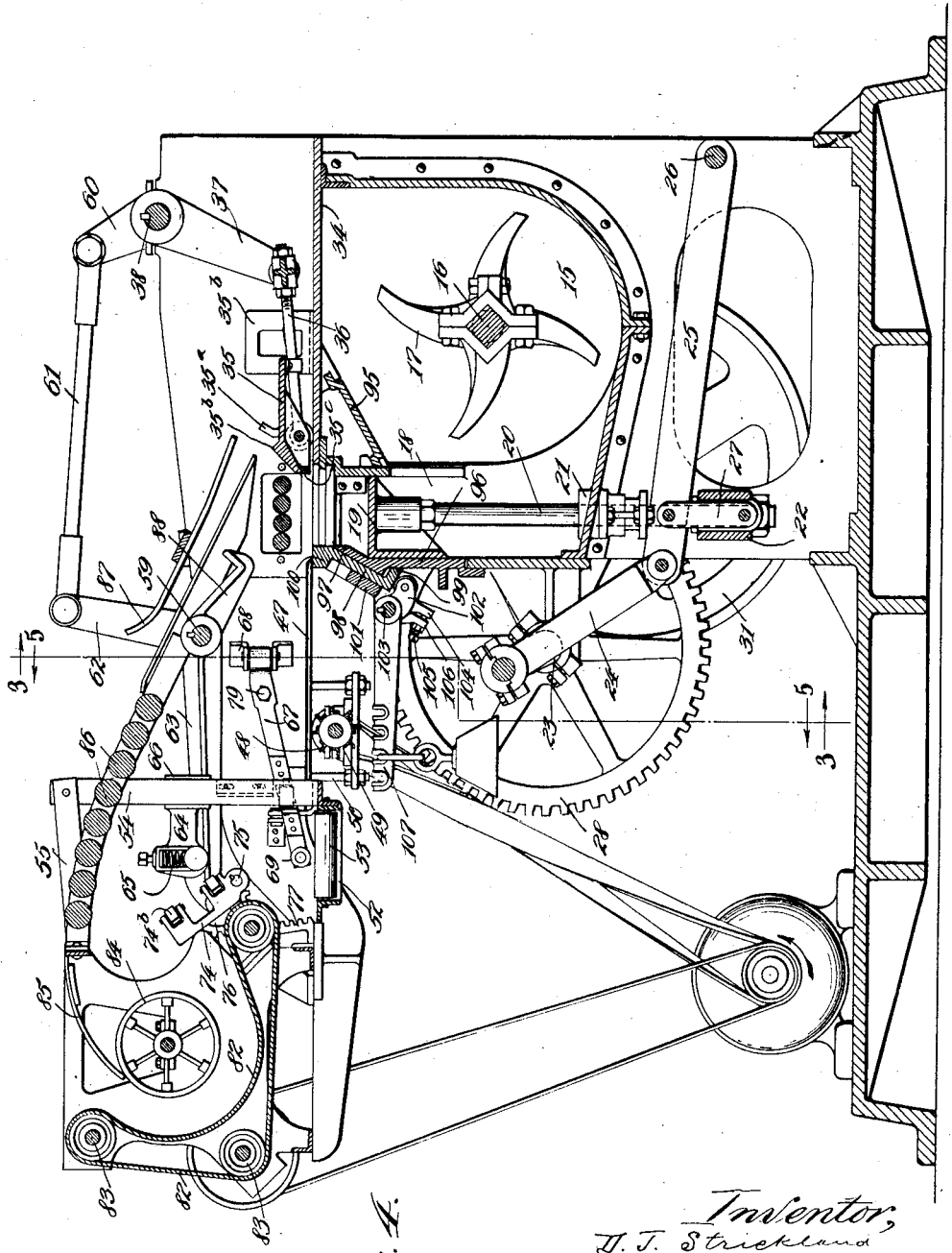

In the drawings forming a part of this specification Figure 1 is a side view of an automatic brick machine embodying my invention; Fig. 2 is a top plan view of the same, part being broken away; Fig. 3 is a sectional elevation on the line 3—3 of Fig. 1; Fig. 4 is a vertical longitudinal sectional view; Fig. 5 is a detail section on the line 5—5 of Fig. 4; Fig. 6 is a detail sectional plan taken on the line 6—6 of Fig. 1; Fig. 7 is a detail view illustrating a portion of the mold discharging and lifting mechanism; Fig. 8 is a detail sectional view on the line 8—8 of Fig. 7; Fig. 9 is an enlarged end view of one of the mold grips; Fig. 10 is a detail sectional view on the line 10—10 of Fig. 9; Fig. 11 is a detail sectional view on the line 11—11 of Fig. 6; and Figs. 12 and 13 are similar views illustrating the different positions of the various parts during operation.

In the practical embodiment of my automatic brick machine I employ a horizontal pugging trough or chamber 15 in which rotates the pug shaft 16 provided with pugging or tempering blades 17 and one or more wiper blades for forcing the clay into the charging chamber 18 which is preferably arranged upon the forward side of the pugging chamber at one end thereof. Reciprocating in this chamber is the piston or plunger 19 carried at the upper ends of the piston rods 20 which work through stuffing boxes 21 in the bottom of the pugging chamber and connected at their lower ends to a cross head 22. This piston 19 reciprocates vertically and forces the clay upwardly through the dies, in contradistinction to forcing the clay downwardly through dies which is the common practice in brick making machines. The piston 19 is operated from a crank shaft 23 mounted upon the forward side of the machine, the crank portion thereof having a pitman 24 connected thereto, the lower end of said pitman being in turn united to the forward end of a lever 25 pivoted at 26 at the extreme rear of the machine, this lever 25 being connected to the cross head 22 through the medium of links 27 so that when the crank shaft 23 is rotated motion is communicated by the pitman 24 and lever 25 to the cross head and consequently to the piston. The crank shaft 23 has a gear 28 upon one end meshing with a pinion 29, said pinion 29 being arranged upon a shaft 30 carrying the belt pulley 31, and this shaft 30 also has a pinion 32 arranged thereon which meshes with the gear 33 upon the end of the pug shaft so that from this shaft, power is transmitted to both the pug shaft and the plunger operating crank shaft.

A portion of the pug mill casing is covered by means of a flat table 34 upon which reciprocates the mold feeder 35, said feeder being operated by the rods 36 bolted to a casting carried between the lower ends of the downwardly extending rocker arms 37 keyed upon the shaft 38, one end of said shaft having a double rocker arm 39 extending upwardly therefrom and to which is connected the upper end of a pitman 40, the lower end of this pitman being connected to a crank disk 41 mounted upon the adjacent end of the pug shaft, the pitman 40 being adjustable both as to length and also regarding its connection with the crank disk whereby the throw of the rock shaft 38 can be regulated according to the size of the mold which is being fed by the mold feeder 35.

As the pug shaft rotates to temper and feed the clay to the compression chamber the piston reciprocates therein and simultaneous with these operations is the feeding of the mold (not shown) over the die plate 42 and beneath the platen 43. The die plate 42 has as many openings as there are compartments in the mold, and the platen 43 is preferably composed of a plurality of rods arranged in plates 44 and adjustably mounted in openings 45 by means of set screws 46 as most clearly shown in Fig. 1. Upon the upward stroke of the piston the clay is forced through the openings in the die and the compartments of the mold completely filled. During this pressing operation the feeder 35 has moved rearwardly to receive another mold which is fed in front of the feeder in a manner hereinafter explained, and upon the down stroke of the piston the feeder is moved forwardly pushing the filled mold forwardly upon tracks 47, this forward movement of the filled mold being accomplished by the feeder forcing in the empty mold ready to receive the charge of clay through the die plate upon the next upward stroke of the piston. The filled mold as it is fed forwardly is brought directly over a rapidly revolving trimmer 48 mounted in suitable bearings 49 adjustably suspended by bolts 50 connected to the forwardly projecting portions 51 of the main frame, and by means of this trimmer all of the surplus clay is removed and a smooth polish or finish imparted to the face of the brick.

From the tracks 47 the mold is pushed forwardly upon a mold receiving frame 52 which is of a size substantially the same as the mold which it receive and is provided with longitudinally arranged rollers 53. The mold receiving frame 52 is rigidly attached to the lower ends of the upright arms 54 which at their upper ends are pivotally connected to horizontal arms 55, pivoted at 56 to the upper portions of the side members of the frame as most clearly shown in Figs. 1, 2 and 4. The mold receiving frame is intended to receive the pallet 57 upon which the bricks 58 are deposited as hereinafter explained, and after receiving the bricks from the mold upon the pallet the frame drops to the inclined position shown in Fig. 7 in order that the pallet with the bricks thereon may be discharged to the endless conveyer (not shown).

This downward movement of the mold receiving frame is accomplished by motion received from the rock shaft 38 transmitted to a second rock shaft 59 through the medium of the rocker arm 60, pitman 61 and rocker arm 62, the shaft 59 being mounted in the sides of the frame. Projecting forwardly from the shaft 59 and keyed thereto are the parallel mold operating arms 63, which are connected to the upright arms 54 by means of fingers 64 having a frictional pivotal connection 65 between the arm and finger and this finger 64 carries a guide 66 in which the upright arm is connected as most clearly shown in Figs. 1, 2, 4 and 7, this construction and arrangement being such that as the arms 63 move downwardly the upright arms 54 are caused to move downwardly also and these upright arms being pivotally connected to the frame through the medium of the pivoted arms 55 cause the upright arms 54 to swing rearwardly a sufficient distance to give the proper inclination to the receiving frame 52 having thereon the pallet and bricks. Before the frame 52 moves downwardly to any considerable extent the bricks must be discharged from the mold and this is accomplished by means of striker arms 67 pivoted to the sides of the frame at 68 and provided with hammers 69 at their forward ends, the arms 67 being thrown inwardly to bring the hammers into contact with the ends of the mold by means of coil springs 70, said arms 67 being normally held retracted by means of a trigger 71 pivoted to the side of the frame and engaging the arm 67 as shown in Fig. 11 and this trigger 71 is released by a trip 72 carried by the frame 52. The moment this frame begins its downward movement, the trip 72 lifts the trigger 71 and the springs 70 actuate the knocker arms immediately forcing the hammers against the ends of the mold, striking a sharp blow at each end which is sufficient to completely dislodge the bricks from the mold and deposit them upon the pallet. The arms 54 are provided with cams or inclines 73 which engage the knocker arms during the continued downward movement of the arms 54 and thereby force said arms outwardly so as to bring them once more into locked engagement with the trigger 71 as most clearly shown in Fig. 13. Fig. 11 shows the positions of the parts when the mold is first projected upon the receiving frame 52. Fig. 12 indicates the positions of the parts just as the frame starts downwardly and releases the knocker arms and Fig. 13 shows the parts reset at the completion of the downward movement of the receiving frame 52.

As soon as the bricks are loosened from the mold it is necessary to lift this mold in order to discharge the bricks upon the pallet; and this is accomplished by means of mold grips 74 carried at the forward ends of the arms 63 at the inner sides thereof, said mold grips being keyed to inwardly projecting stub shafts 75 which project inwardly from the toothed segments 76 pivotally mounted upon the ends of the arms 63, each toothed segment 76 engaging a rack 77 fixed upon the frame of the machine, so that when the arm 63 is moved downwardly the segment 76 is turned in the direction of the arrow indicated in Fig. 1 and the mold grip is simultaneously carried downwardly and turned over to the position shown in Figs. 7, 9 and 10. The mold grips each consist of a side casting 74 having bifurcated leg portions 74$^a$ in which are pivoted the gripping pawls or dogs 74$^b$. These pawls or dogs have springs 74$^c$ connected thereto and to the castings 74, the normal tendency of the springs being to project the pawls or dogs inwardly toward the ends of the molds, and as the mold grips are turned over and moved downwardly by the movement of the segment 76, these pawls spring over and engage under the shouldered ends 80 of the molds; and when the arms 63 move upwardly, the mold grips and mold move up also, the mold swinging through the arc of a circle and turning over, so that when it reaches its uppermost position it will drop by gravity from the grip 74 and fall upon an endless leather belt 82 traveling around the flanged rollers 83 suitably mounted in the side members of the frame. A drum or wheel 84 is mounted centrally with reference to these rolls and endless belt so that the molds after being released from the grip fall upon the endless belt and pass around beneath the wheel or drum 84 and climb the upwardly curved guide 85 from which it moves upon the inclined raceway 86 consisting of side members and rollers, the mold passing between the parallel guides 87 where it is stopped by the upwardly projecting stop finger 88 carried by the rock shaft 59 which is moved upwardly as the arms 63 are moved downwardly so as to permit one mold only to be discharged to the feeder 35, said feeder having upwardly projecting stop fingers 35$^a$ which stop the mold, and as the feeder moves rearwardly the nose 35$^c$ engages the mold and draws it back until it engages the stripper plates 35$^d$ which tilt it over the inclined face 35$^b$ and position it for its forward movement over the die plate.

A baffle plate 95 is arranged in the upper corner of the pugging chamber for the purpose of directing the clay toward the charging chamber in which the piston 19 is vertically reciprocating and it will be noted that suitable guideways are provided for this piston which is also constructed with a wide flange or skirt to guide and steady the movement of said piston. The forward plate 96 of the charging chamber is bent inwardly at its upper end as shown at 97 and resting upon the front side of said inwardly bent end is a safety gate 98 which has a foot 99 at its lower end and has its head 100 shaped to lie flush with the end 97 and constitutes a portion of the charging chamber, a cleat or bar 101 holding this gate in position against the plate 97 but permits this gate to slide downwardly as hereinafter explained whenever any obstruction is encountered, thereby avoiding breakage.

The safety gate is normally held raised by means of arms 102, loosely mounted upon a cross shaft 103 and having fingers 104 which are engaged by set screws 105 carried by arms 106 fast upon the shaft 103, the arms 106 being held in engagement with the fingers 104 by a weighted lever 107, the weight being adjustable so that the degree of resistance can be regulated. When an obstruction is encountered, the safety gate is forced down as it cannot move in any other direction the foot forcing the arms 102 downwardly and outwardly and acting upon the arms 106 and lifting the weight, which restores the parts to their normal position as soon as the obstruction is passed or removed.

In a brick machine constructed in accordance with my invention it is only necessary to introduce the clay into the pugging chamber and all the brick making operations will be automatically carried out. The clay is forced into the charging chamber and the upwardly moving piston forces it through the die into a mold which has previously been placed above the die and beneath the platen by an automatic mold feeder which has previously received it from an automatic mold sanding device.

After the mold has been filled it is forced along forwardly and trimmed by a rotary cutter which gives the brick a perfectly smooth finish. The mold is then emptied by the knocker arms and the mold is picked up and thrown into the sanding device while the bricks upon the pallet have been shunted off to a conveyer. The emptied mold after being sanded is sent back to the mold feeder and thus used over and over again, the only manual operation being the placing of the pallets upon the mold receiving frame for the purpose of receiving the bricks thereon when the mold is knocked and picked up, leaving the bricks upon the pallet.

Having thus described my invention, what I claim is:—

1. In a brick machine, the combination with an upwardly movable piston, of a charging chamber in which said piston works, a die and platen in alinement with said piston, an inverted mold adapted to be moved between said die and platen, and means for moving said inverted mold into and out of alinement with said die.

2. In a brick machine, the combination with an upwardly movable piston, of a charging chamber in which said piston works, a die and platen in alinement with said piston, an inverted mold adapted to be moved between said die and platen, and means for moving said mold, means for trimming the clay from the lower face of the filled mold, means for receiving said filled and trimmed mold face downward, means operable upon said molds to cause the brick to be discharged by gravity, and means for elevating and reversing the mold so discharged.

3. In a brick making machine, the combination with a mold receiving frame and means for lowering and raising the same, of knocker arms for striking a mold upon said frame, means for normally holding said arms out of the path of the mold and means connected with said frame for releasing said arms.

4. In a brick making machine, the combination with a mold receiving frame and means for lowering and raising the same, of knocker arms for striking a mold upon said frame, means for normally holding said arms out of the path of the mold, means connected with said frame for releasing said arms and means for resetting said holding means.

5. In a brick making machine, the combination with a mold receiving frame, and means for lowering and raising the same, of spring actuated knocker arms for striking a mold upon said frame, means for locking said arms, means carried by said frame for releasing said arms, and means relocking said arms and leaving the mold free upon the frame.

6. In a brick machine, the combination with a mold and means for moving the same, of means for gripping said mold comprising a pivoted casting, actuating means for lowering and elevating said pivoted casting and spring actuated pawls and dogs carried by said casting and adapted to engage said mold.

7. In a brick making machine, the combination with a movable mold receiving frame, and means for moving the same, of a stationary rack, a segment meshing with said rack, a mold grip connected with said segment, and means connecting said segment and frame moving means.

8. In a brick machine, the combination with a mold and means for removing the same, of a mold receiving frame, means for lowering said mold receiving frame together with a mold gripping device adapted to grip the mold as said frame is lowered together with means for causing said parts to move in unison.

9. In a brick machine, the combination with a mold receiving frame, of spring knocker arms, and means for locking the same in retracted position, and means for releasing said locking means and simultaneously lowering and tilting said frame.

10. In a brick making machine, the combination with a pug mill having a charging chamber, said charging chamber being arranged at the top of said pug mill, and an upwardly movable piston working in said charging chamber, an inverted die and platen above and in line with said piston, and means for moving said piston.

11. In a brick making machine, the combination with a pug mill and upwardly movable piston, of an inverted die and platen arranged above and in alinement with said piston, said inverted die and platen being spaced apart to receive a mold therebetween, and means for feeding an inverted mold between the die and platen.

12. In a brick making machine, the combination with a pug mill and upwardly moving piston, of an inverted die and platen arranged above said piston and spaced apart, a table upon one side of said inverted die, and a track upon the opposite side of said die, and means for moving an inverted mold from the table between the die and platen and upon the track.

13. In a brick making machine, the combination with a pug mill, vertically movable piston, an inverted die and platen in alinement with said piston, of a table upon one side of said die, a track upon the opposite side, means movable upon the table for feeding the mold between said die and platen, and a rotary trimmer arranged beneath the track.

14. In a brick making machine, the combination with a pug mill, piston, inverted die and platen, a table arranged above the pug mill, a reciprocating mold feeder movable upon said table and adapted to force the molds between the die and platen, a track extending forwardly from the opposite side of said die, a movable mold receiving frame at the forward end of said track, and a rotary trimmer arranged beneath the track and intermediate its ends.

15. In a brick making machine, the combination with a pug mill, piston, die and platen, of a table and reciprocating mold feeder, a forwardly extending track, a mold receiving frame at the forward end of said track, means operable upon said mold whereby the brick can be discharged by gravity, means for lifting said mold together with means for returning said mold to the reciprocating mold feeder.

16. In a brick making machine, the combination with a pug mill, piston, die and platen, of a table arranged above the pug mill, a reciprocating mold feeder arranged upon said table, a forwardly extending track, means operable upon said mold whereby the brick will be discharged by gravity. a mold receiving frame at the forward end of said track, means for lifting said mold, and means for conveying said mold to a sanding apparatus and returning the same to the mold feeder.

17. In a brick making machine, the combination with a track, of a mold receiving frame at the forward end thereof, means for inverting and advancing a mold to said frame, knocker arms adapted to strike said mold whereby the brick may be discharged from said mold by gravity together with means for actuating said arms and lifting said mold after being relieved of the brick and delivering the same to the advancing mechanism.

18. In a brick making machine, a track together with means for inverting and moving the molds along said track, a mold receiving frame at the forward end of said track, knocker arms adapted to strike the ends of said mold whereby the brick may be discharged from said mold by gravity, mold grips adapted to engage said mold after being emptied together with means for moving said grips, and means for returning said molds after they are discharged from the grips.

19. In a brick making machine, the combination with a track, of a downwardly movable mold receiving frame at the forward end thereof, knocker arms operatively connected with said frame, mold grips, and operative connections between said mold grips and mold receiving table for actuating said grips when the receiving table is lowered.

20. In a brick making machine, the combination with a track and means for moving the molds along the same, a mold receiving frame at the forward end of said track, knocker arms for engaging the ends of said mold, mold grips and movable arms for carrying said grips, and means carried by said arms for operating said grips and simultaneously lowering the mold receiving table.

21. In a brick making machine, the combination with an endless mold receiving belt, mold grips adapted to discharge the molds upon said belt, movable arms carrying said mold grips, means operative from said arms for rotating said grips, a mold receiving frame, knocker arms, means for actuating said grips and said knocker arms and simultaneously lowering the mold receiving frame, and a track together with means for moving the molds along said track as set forth.

22. In a brick making machine, the combination with a mold receiving frame and means for lowering and raising the same, of knocker arms striking a mold upon said frame, connections between said knocker arms and said frame whereby said arms are caused to strike said mold upon the lowering of the frame and means for thereafter engaging said mold for moving same to the conveyer mechanism.

23. In a brick making machine, the combination of a track, means for inverting and moving a mold along said track, a mold receiving frame, means for lowering and raising the said frame, knocker arms controlled by the lowering of said frame for pounding said inverted mold and gripping and transfer devices adapted to thereafter grip said mold and convey the same to a return conveyer mechanism.

24. In a brick making machine, the combination, with a pug mill having a charging chamber, a movable piston working in said charging chamber, a die and platen coöperating with said piston and means for actuating said piston, said charging chamber being provided with a safety gate whereby the parts are caused to yield under undue pressure.

25. In an automatic brick machine, the combination of a track along which molds are adapted to travel, means for conveying and delivering empty molds in an inverted position to one end of said track, a charging chamber beneath said track, means in said chamber for filling said inverted molds from below, means for moving said inverted molds along said track over said chamber, means for dislodging the bricks from said molds after the filling operation and while the molds are still on said track and in an inverted position whereby the bricks fall by gravity therefrom and means for receiving said empty molds and conveying them to said first named conveying and delivering means.

26. In an automatic brick machine, the combination of a horizontal track along which molds are adapted to travel, means for conveying and delivering empty molds in an inverted position to one end of said track, a charging chamber beneath said track, means in said chamber for filling said inverted molds from below, means for intermittently moving said inverted molds along said track over said chamber, means for dislodging the bricks from said molds after the filling operation and while the molds are still on said track and in an inverted position whereby the bricks fall by gravity therefrom and means for receiving said empty molds and conveying them to said first named conveying and delivering means.

27. In an automatic brick machine, the combination of a track along which molds are adapted to travel, means for conveying and delivering the empty molds in an inverted position to one end of said track, a charging chamber beneath said track, means in said chamber for filling said inverted molds from below, means for moving said inverted molds along said track over said chamber, and means for delivering a sharp blow to said filled mold while still on said track whereby the bricks fall therefrom by gravity and for receiving the empty molds and conveying them to said first named conveying and delivering means.

28. In an automatic brick machine, the combination of a horizontally disposed track along which molds are adapted to travel, means for inverting, conveying and delivering the empty molds to one end of said track, a charging chamber beneath said track, means in said chamber for filling said inverted molds from below, means for intermittently moving said inverted molds along said track over said chamber, and means for delivering a sharp blow to said inverted molds while still on said track and in an inverted position whereby the bricks fall therefrom by gravity and for receiving the empty molds and conveying them to said first named conveying and delivering means.

29. In an automatic brick machine, the combination of a track along which molds are adapted to travel, means for conveying and delivering empty molds in an inverted position to the forward end of said track, a charging chamber located at a point along said track, means in said chamber for forcing the material therein up into said inverted molds, means for moving said inverted molds along said track, means at the rear end of said track for delivering a hammer blow to said inverted molds as they are received and thereby dislodging the bricks therefrom and means for receiving and conveying the empty molds from the rear end of said track and conveying them to said first named conveying and delivering means.

30. In an automatic brick machine, the combination of a horizontally disposed track along which molds are adapted to travel, means for conveying and delivering empty molds in an inverted position to the forward end of said track, a charging chamber located at a point along said track, means in said chamber for forcing the material therein up into said inverted molds, means for intermittently moving said inverted molds along said track, means at the rear end of said track for delivering a hammer blow to said inverted molds as they are received and thereby dislodging the bricks therefrom and means for receiving and conveying the empty molds from the rear end of said track and conveying them to said first named conveying and delivering means.

31. In an automatic brick machine, the combination of a track along which molds are adapted to travel, means for conveying and delivering empty molds in an inverted position to the forward end of said track, a charging chamber beneath said track, means in said chamber for filling said inverted molds from below, means for moving the said inverted molds along said track and from over said chamber, a vertically movable frame at the rear end of said track for receiving said filled molds, means for lowering said frame and simultaneously therewith delivering a hammer blow thereto whereby the bricks are discharged therefrom by gravity and means for receiving the empty molds from said frame and conveying them to said first named conveying and delivering means.

32. In an automatic brick machine, the combination of a horizontally disposed track along which molds are adapted to travel, means for conveying and delivering empty molds in an inverted position to the forward end of said track, a charging chamber beneath said track, vertically reciprocable means in said chamber for filling said inverted molds from below, means for moving the said inverted molds along said track and from over said chamber, a vertically movable frame at the rear end of said track for receiving said filled molds, means for lowering said frame and simultaneously therewith delivering a hammer blow thereto whereby the bricks are discharged therefrom by gravity and means for receiving the empty molds from said frame and conveying them to said first named conveying and delivering means.

33. In an automatic brick machine, the combination of a track along which molds are adapted to travel, a charging chamber beneath said track, means in said chamber for filling said molds from below, means for moving said molds while in an inverted position along said track and over said chamber, means for dislodging the bricks from the inverted molds at the rear end of the track, means for lifting the empty molds and delivering them to a conveying mechanism and means coöperating with said conveying mechanism for returning the molds one by one in an inverted position to the forward end of said track.

34. In an automatic brick machine, the combination of a track along which molds are adapted to travel, a charging chamber beneath said track, means in said chamber for filling said molds from below, means for moving said molds while in an inverted position along said track and over said chamber, means for dislodging the bricks from the inverted molds at the rear end of the track, means for lifting the empty molds and delivering them to a conveying mechanism and means coöperating with said conveying mechanism for inverting and returning the molds one by one to the forward end of said track.

In testimony whereof I hereunto affix my signature.

DAVID J. STRICKLAND.